United States Patent [19]
Krupa

[11] 3,859,032
[45] Jan. 7, 1975

[54] ADJUSTING MECHANISM FOR RESTRICTOR BAR OF A SLOT EXTRUSION DIE

[75] Inventor: Vernon J. Krupa, Chippewa Falls, Wis.

[73] Assignee: Extrusion Dies, Incorporated, Chippewa Falls, Wis.

[22] Filed: Nov. 28, 1973

[21] Appl. No.: 419,710

[52] U.S. Cl. ............................. 425/466, 425/381
[51] Int. Cl. .............................................. B29f 3/00
[58] Field of Search ........... 425/461, 466, 465, 376, 425/380, 145

[56] References Cited
UNITED STATES PATENTS
| | | | |
|---|---|---|---|
| 2,387,718 | 10/1945 | Coleman | 425/466 |
| 3,480,998 | 12/1969 | Von Erdberg | 425/382 X |
| 3,680,997 | 8/1972 | Dukert et al. | 425/192 X |

OTHER PUBLICATIONS
Schenkel, G. P., Effects of Recent Fundamental Investigations on Extruder Design, International Plastics Engineering, Oct. 1961.

*Primary Examiner*—R. Spencer Annear
*Assistant Examiner*—Mark Rosenbaum
*Attorney, Agent, or Firm*—Edward U. Dithmar

[57] ABSTRACT

An adjusting mechanism for the restrictor bar of a slot extrusion die for making thermoplastic film or sheet, the adjusting mechanism having a plurality of spaced studs secured to the restrictor bar and extending through openings in the die body beyond the exterior surface of the body. Key means detachably secured to the die body cooperate with non-circular portions of the studs to prevent stud rotation and permit axial stud movement during adjustment. Each stud has an elongated adjusting nut threaded on the outer end portion. A nut retainer means detachably secured with respect to the die body prevents axial movement of the nuts and permits nut rotation to move the studs axially and thus adjust the restrictor bar as needed. In more detailed aspect, each stud has a short length of reduced cross section outwardly of the non-circular portion, providing a calibrated break point at a location enabling ready stud replacement from the exterior of the die body in the event of stud failure. Thus, damage in the adjusting mechanism is subject to quick repair without major disassembly, or even removing the die from service.

4 Claims, 2 Drawing Figures

ADJUSTING MECHANISM FOR RESTRICTOR BAR OF A SLOT EXTRUSION DIE

BACKGROUND OF THE INVENTION

This invention relates to a slot extrusion die having a die body and an adjustable internal elongated restrictor bar for adjusting slot size, and more particularly to an adjusting mechanism for the restrictor bar wherein a damaged part readily may be removed and replaced from the exterior of the die body in short time without removing the die from service. The slot die embodying the invention extrudes thermoplastic films and sheets of highly uniform thickness.

Numerous mechanisms for adjusting the comparatively inaccessible restrictor bar of a slot extrusion die have been used in the past, and all have certain shortcomings, most of which have been overcome by the present development. The prior adjusting mechanisms employ a plurality of spaced studs connected in one way or another with the restrictor bar, the action of the studs being effective to raise and lower associated portions of the restrictor bar in order to vary as needed the thickness dimension of the extrusion slot.

In some prior adjusting mechanisms the studs are secured non-rotatably to the restrictor bar by such means as cross pins, set screws, weldments or the like. The shortcoming of this mechanism is that in the event of failure of a stud, the die must be removed from service and substantially dismantled in order to make repair. Shutdown time and repair time both are costly, and it is of great advantage to eliminate or minimize this expense.

In other prior adjusting mechanisms the studs have threaded relation with the restrictor bar, and the studs are secured against axial movement. Adjustment involves rotating the studs so the restrictor bar moves up and down due to action of the connecting threads. Here again, the die must be removed from service and partially disassembled in order to correct failure in the threaded relation between stud and restrictor bar.

Other prior adjusting mechanisms employ studs threaded in the die body. Damaged threads or stud failure within the die body involves shutdown and complex repair.

SUMMARY OF THE INVENTION

The present invention contemplates an adjusting mechanism for the restrictor bar of a slot extrusion die that includes, as is more or less conventional, a plurality of spaced studs secured to the restrictor bar and extending through openings in the die body well beyond the exterior surface of the body. Each stud of the invention, contrary to past practice, has a non-circular intermediate portion of minor length exterior of the die body. The outer end portion of each stud is threaded.

A key means is detachably secured to the exterior of the die body in effective relation with the non-circular portions of the studs, the key means preventing stud rotation and permitting axial stud movement. The dimension of the key means in direction of stud movement is greater than the axial length of the non-circular stud portions.

An elongated nut is threaded on the outer end portion of each stud, and each nut has a peripheral flange spaced from the outer nut end.

A nut retainer means for preventing axial movement of the nuts overlies the nut flanges and the key means, the nut retainer means being detachably secured with respect to the die body and having openings therethrough. The elongated nuts extend through and beyond the openings in the nut retainer means. The several nuts are adjusted rotatably to impart axial movement to the studs, which movement provides adjustment of the restrictor bar to control the effective thickness dimension of the extrusion slot.

In view of the fact that the studs are non-rotatable, they can have simple threaded relation with the restrictor bar without danger of failure at the connection with the restrictor bar.

If the threads between stud and adjusting nut of one of the studs become damaged as by overstressing, repair is readily and quickly made without dismantling the die or even removing the die from service. Repair is accomplished by removing the nut retainer means and key means associated with that stud, removing the stud from the restrictor bar by simple rotation, replacing the damaged stud and nut with new ones, and replacing the key means and nut retainer means. The entire repair job can be handled in minutes from the exterior of the die without removing the die from service, thereby eliminating shutdown time and reducing repair time to a minimum.

In more detailed aspect, each stud has a short length of reduced cross-section outwardly of the non-circular intermediate portion. This length of reduced cross-section provides the calibrated break point at a location enabling ready stud replacement from the exterior of the die body in the event of stud breakage.

In preferred form, the exterior die body surface has a recess surrounding the stud openings, and the key means in part is disposed in the recess and secured to the die body by the overlying nut retainer means.

DESCRIPTION OF THE PREFERRED EMBODIMENT

Figure 1:
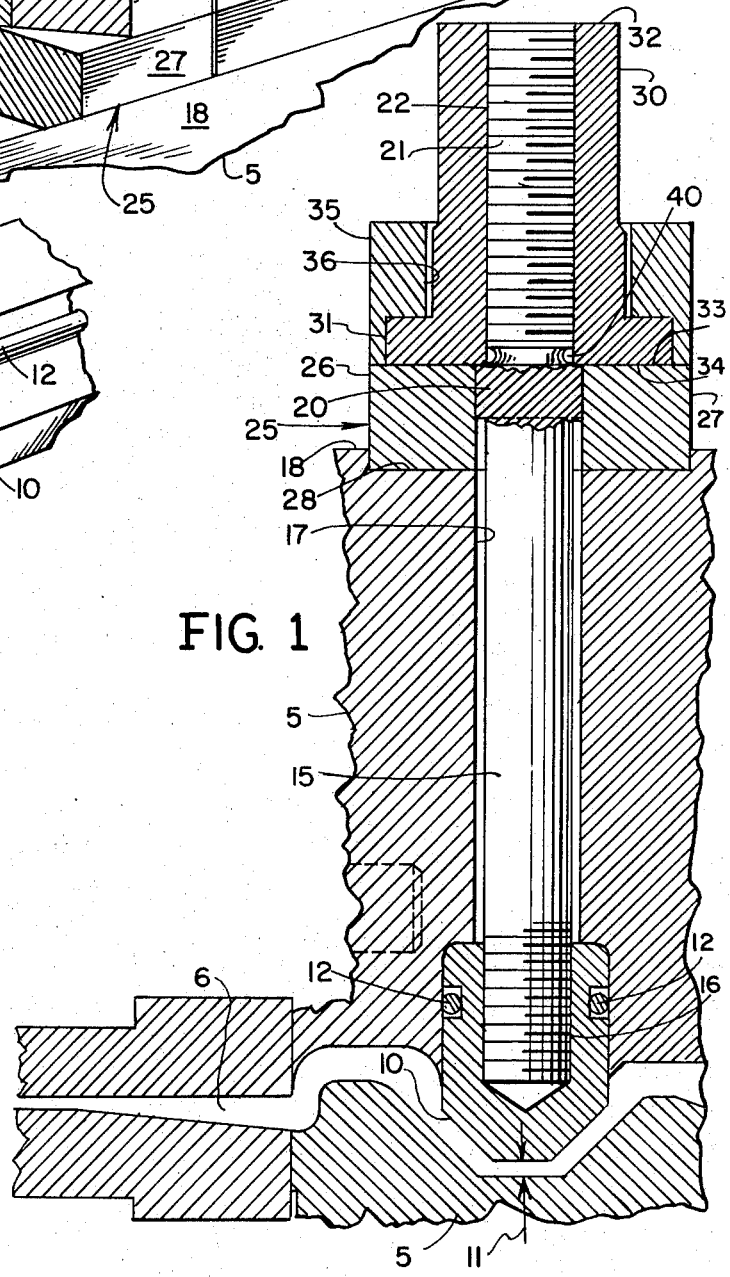
FIG. 1 is a longitudinal sectional view, partly broken away, through the portion of a slot extrusion die embodying the extrusion slot, internal restrictor bar and one unit of mechanism for the external adjustment of the restrictor bar.

Referring first to FIG. 1, the numeral 5 designates a portion of the die body of a slot extrusion die well known in the art. Thermoplastic material under pressure is extruded through a transverse slot 6 into a thin film or sheet which beyond the die passes around or between cooling, finishing and take-away rolls (not shown), all well known in the art.

The amount of material delivered to slot 6 is determined by adjustment of an elongated restrictor bar 10 which extends transversely within the die body and serves as a valve to control the slot dimension indicated generally by the arrows 11. Restrictor bar 10, as shown, has up and down adjusting movement in a guiding recess in the die body, and bars 12 of suitable material carried in lateral recesses in the bar provide a seal, and, and some instances, lubrication.

Figure 2:
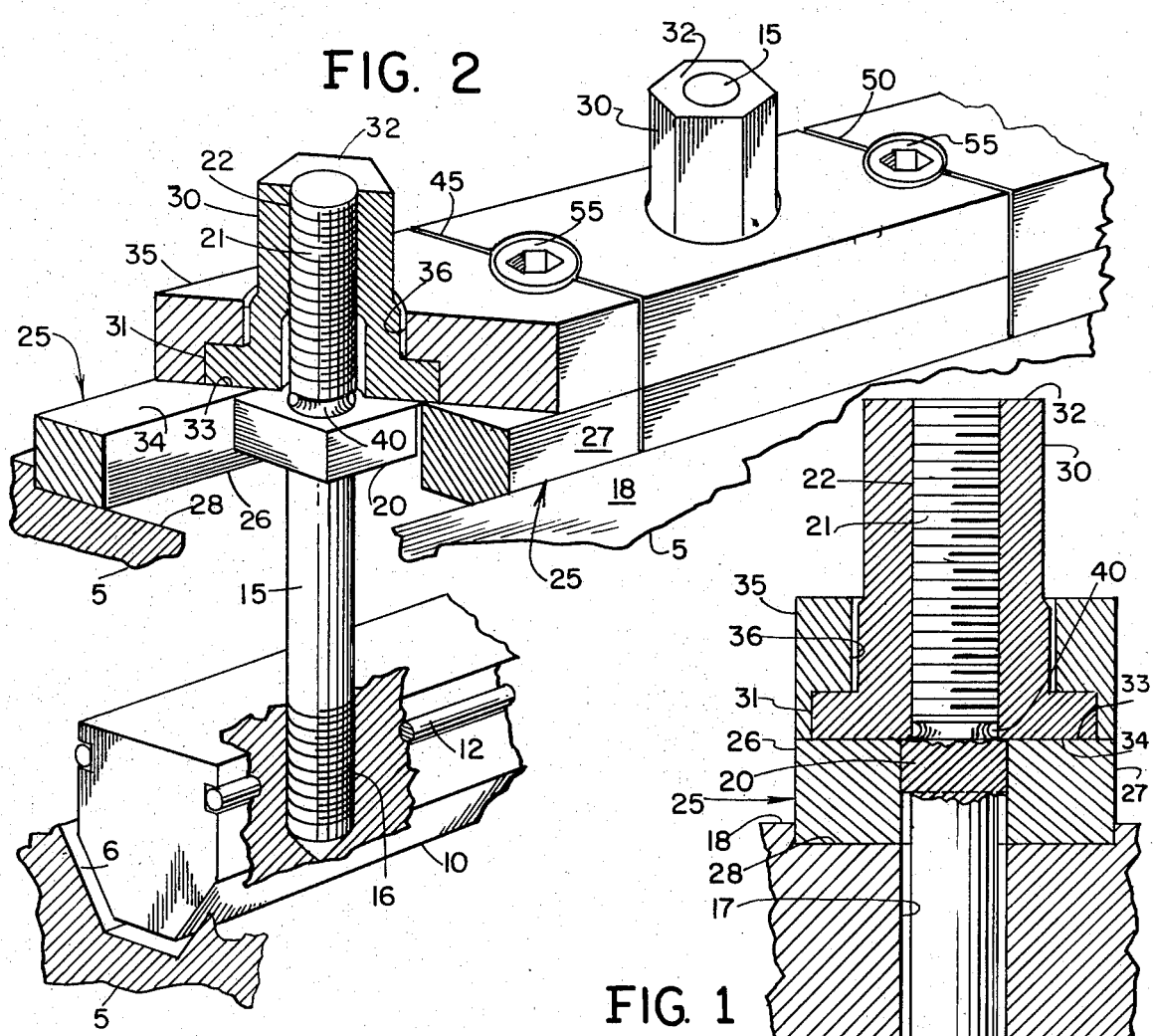
FIG. 2 is a perspective view, partly in section, further illustrating a unit of the adjusting mechanism, and illustrating the relationship between one unit and another unit along the width of the extrusion die.

The adjusting mechanism of the invention, particularly one unit of the mechanism, is best shown in FIG. 2, and the description immediately following mainly will be referred to that figure. The mechanism includes a plurality of spaced studs 15, two of which are shown in FIG. 2. Studs 15 are spaced across the transverse width of the die for a total distance slightly less than the length of restrictor bar 10.

Each stud 15 is secured at 16 to restrictor bar 10. In preferred form, stud 15 has threaded relation with bar 10, and, as will be seen, the threads are not vulnerable to damage because stud 15 during restrictor bar adjustment is non-rotatable with respect to the bar. Thus there is no region of stress concentration either in bar 10 or stud 15 at the connection between the two.

Studs 15 extend through aligned openings 17 (FIG. 1) in the die body 5, and project beyond exterior surface 18 of the body. Each stud 15 has a non-circular intermediate portion 20 of minor length located exteriorly of body 5, and threads 21 on outer end portion 22.

Each stud 15, of course, is a component of one unit of the adjusting mechanism of the invention. The several units are substantially alike, so only one needs to be described in detail.

A key means generally designated 25 is detachably secured to die body 5 in effective relation with the non-circular portion 20 of a stud 15. Key means 25, as will be understood, prevents stud rotation and permits axial stud movement. The dimension of key means 25 in the direction of stud movement is greater than the axial length of non-circular portion 20 so stud 15 will have the desired range of axial movement.

In the form of the invention illustrated, key means 25 comprises two transverse bars 26 and 27 located one on each side of non-circular stud portion 20. The exterior surface of die body 5 has a recess 28 surrounding body opening 17, and bars 26 and 27 of key means 25 are disposed in part in recess 28, as shown in both figures. As will be seen later, another member of the mechanism overlies the bars 26 and 27 and holds them in secure engagement with die body 5, the lateral walls of recess 28 also cooperating to maintain the key bars in proper position.

An elongated nut 30 is threaded on outer end portion 22 of each stud 15, nut 30 having a peripheral flange 31 spaced from the outer nut end 32. The lower surface 33 of flange 31 is in engagement with the upper surface 34 of key means 25, thereby preventing nut 30 from moving in downward direction.

A nut retainer means 35 overlies nut flange 31 and key means 25, and is detachably secured with respect to die body 5. Nut retainer means 35 has an opening 36, and elongated nut 30 extends through and beyond this opening as clearly shown in the figures. The inner length of opening 36 is countersunk to receive and engage flange 31 of nut 30, the engagement preventing outward axial movement of the nut. Thus, nut 30 is prevented from axial movement in either direction, and nut rotation in alternate directions causes up and down movement of stud 15.

In preferred form, each stud 15 has a short length 40 of reduced cross-section located outwardly of and adjacent to non-circular intermediate portion 20. This length of reduced cross-section provides a calibrated break point at a location enabling ready stud replacement from the exterior of the die body in the event of stud failure. This feature effectively prevents failure of the stud at a region within the die body which would necessitate shutdown and substantially disassembly of the die in order to make repair.

As shown in FIG. 2, the numerals 45 and 50 designate butt joints between units of nut retainer means 35 and units of key means 25. Each such unit is a part of an adjusting mechanism unit, but it will be understood that a longer unit of the nut retainer means and a longer unit of the key means could be provided to cooperate with two or more studs 15 and nuts 30. However, the illustrated form is preferred.

Headed bolts 55 pass through countersunk openings in nut retainer means 35 and are threaded into die body 5, the bolts detachably securing the nut retainer means with respect to the die body. The nut retainer means, as mentioned, overlies key means 25 and in cooperation with the lateral walls of recess 28 secure the key means to the die body.

The adjusting mechanism of the invention is such that damage or failure is likely only in the threads between stud 15 and nut 30, or at the stud length 40 of reduced cross section. If either failure develops, it likely will occur at any one time in only one of the several adjusting mechanism units. A failure in one of the units will not disturb significantly the over-all adjusted position of restrictor bar 10, meaning the extrusion die can be continued in service.

Repair from the exterior of the die body readily is accomplished by removing the appropriate pair of accessible bolts 55 which free a unit of nut retainer means 35 and a unit of key means 25. A wrench applied to the non-circular portion 20 of the damaged stud 15 permits ready removal of the stud from restrictor bar 10 and the installation of a new stud, and a new nut 30 if necessary. Key means 25 and nut retainer means 30 then are replaced and secured in position by bolts 55, the entire repair operation involving only a matter of minutes.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. In a slot extrusion die having a die body and an adjustable internal elongated restrictor bar for adjusting slot size, mechanism for external adjustment of the internal restrictor bar, comprising:

a plurality of spaced studs secured to the elongated restrictor bar and extending through openings in the die body beyond the exterior surface of the body, each stud having a non-circular intermediate portion of minor length exterior of the body and threads on the outer end portion;

key means detachably secured to the die body in effective relation with said non-circular stud portions for preventing stud rotation and permitting axial stud movement, the dimension of said key means in direction of stud movement being greater than the axial length of said non-circular stud portions;

an elongated threaded nut on the outer end portion of each stud, each nut having a flange spaced from the outer nut end; and nut retainer means overlying said nut flanges and said key means, said nut retainer means detachably secured with respect to the die body and having openings therethrough, said elongated nuts extending through and beyond said openings, whereby actuation of said nuts causes non-rotational axial movement of said studs in either direction and consequent adjustment of the elongated restrictor bar.

2. The mechanism of claim 1 wherein each stud has a short length of reduced cross section outwardly of said non-circular intermediate portion, providinj a calibrated break point at a location enabling ready stud replacement from the exterior of the die body in the event of stud failure.

3. The mechanism of claim 1 wherein the exterior die body surface has a recess surrounding the body openings for said studs, said key means in part disposed in said recess and secured to said body by said overlying nut retainer means.

4. The mechanism of claim 1 wherein the inner ends of said studs have threaded relation with the internal restrictor bar, whereby there is no relative movement between said stud and said bar during bar adjustment, and a stud readily is removable and replaceable from the exterior of the body.

* * * * *